United States Patent
Garcia

(10) Patent No.: US 7,112,764 B2
(45) Date of Patent: Sep. 26, 2006

(54) DISPOSABLE LINER FOR COOKWARE

(76) Inventor: Kristy Kailynn Garcia, 5304 Canada Vista, NW., Albuquerque, NM (US) 87120

( * ) Notice: Subject to any disclaimer, the term of this patent is extended or adjusted under 35 U.S.C. 154(b) by 481 days.

(21) Appl. No.: 10/619,314

(22) Filed: Jul. 14, 2003

(65) Prior Publication Data

US 2004/0169042 A1  Sep. 2, 2004

Related U.S. Application Data

(60) Provisional application No. 60/450,495, filed on Feb. 27, 2003.

(51) Int. Cl.
*A47J 36/16* (2006.01)

(52) U.S. Cl. .................. 219/429; 219/432; 220/573.4; 220/573.5

(58) Field of Classification Search .................... None
See application file for complete search history.

(56) References Cited

U.S. PATENT DOCUMENTS

| | | | |
|---|---|---|---|
| 3,779,231 A * | 12/1973 | Anderson | 126/373.1 |
| 3,828,966 A * | 8/1974 | Martin | 220/7 |
| 4,005,645 A | 2/1977 | Janssen | |
| 4,164,174 A * | 8/1979 | Wallsten | 99/415 |
| 4,215,629 A | 8/1980 | Janssen | |
| 4,499,817 A | 2/1985 | Janssen | |
| 5,044,265 A | 9/1991 | Janssen | |
| 5,048,688 A | 9/1991 | Hicks, Jr. | |
| 5,613,427 A | 3/1997 | Wiley | |
| 6,193,831 B1 | 2/2001 | Overcash et al. | |
| 6,313,446 B1 | 11/2001 | Jones | |
| 6,398,060 B1 | 6/2002 | Apostolides | |
| 6,457,601 B1 | 10/2002 | Chappell | |
| 6,684,760 B1 * | 2/2004 | Rajusth | 99/449 |
| 6,892,896 B1 * | 5/2005 | Barniak, Jr. | 220/573.4 |
| 2002/0038802 A1 | 4/2002 | Von Tersch | |
| 2002/0079316 A1 | 6/2002 | Greenfield | |
| 2005/0076793 A1 * | 4/2005 | Sizer | 99/403 |

FOREIGN PATENT DOCUMENTS

| | | | |
|---|---|---|---|
| EP | 1576915 A1 * | 9/2005 | |
| FR | 2210370 A * | 8/1974 | |
| FR | 2795613 A1 * | 1/2001 | |
| GB | 2143424 A * | 2/1985 | |

* cited by examiner

Primary Examiner—Joseph Pelham
(74) Attorney, Agent, or Firm—Kevin Lynn Wildenstein

(57) ABSTRACT

A disposable insert or liner conformable to a slow cook cookware (such as, for example, a conventional crock pot or like slow cooking device) having a single interior cooking chamber. The liner is adapted to fit within the interior chamber of a crockpot so as to substantially be in adjacent contact with the crock pot interior chamber walls without interfering with the operation of the cooking device. The liner provides a single compartment which may be made of any material allowing heat conduction between the cookware and the liner. A suitable material may be a tear resistant aluminum foil to withstand typical food preparation in a crock pot. In one embodiment, the present invention includes a flange, notches, indentations or other formations which assist in the insertion and removal of the present invention in the cookware. The present invention advantageously provides for a desirable cooking environment, allows easy removal of food from the crock pot and provides simplified cleaning of the crock pot.

31 Claims, 3 Drawing Sheets

DISPOSABLE LINER FOR COOKWARE

CROSS REFERENCE TO RELATED APPLICATIONS

The present invention claims priority from U.S. Provisional Patent Application 60/450,495 filed Feb. 27, 2003.

FIELD OF INVENTION

The present invention relates generally to the culinary arts, and more specifically, to a cooking liner for use with a crock pot having a single interior cooking chamber or like cooking devices.

BACKGROUND OF THE INVENTION

Cookware has existed for centuries in many different forms. Over time, cookware has become more technologically sophisticated due to advances in material sciences. Some cookware are even advertised to have special surfaces, or coatings on surfaces, which prevent foodstuff from sticking to the surface. While some cooking devices, such as crock pots, may include a non-stick surface in its interior cooking chamber, there are numerous existing crock pots which do not. In these situations, while crock pots provide even or substantially uniform heat conduction throughout its interior chamber and require minimal electrical energy to operate, some food may burn or otherwise stick to the interior chamber walls making it difficult to scrape off during cleaning Moreover, crock pots having a conventional ceramic or stoneware interior cooking chamber are still being sold in the market today which do not contain a non-stick surface.

One of the most common types of containers used in the cooking arts in an cooking vessel (such as an oven) is the aluminum pan or like structure made from a sheet of aluminum foil. Such containers may be preformed into a specific shape, thus avoiding the labor required for assembly of a shaped article. Such containers, when traditionally used and sold, can be stacked easily since the shape of each container registers with shapes of adjacent containers. Thus, such containers are easy to manufacture, can be manufactured without much expense, and can easily be stored or discarded. The use of aluminum foil containers also have the advantage of being resistant to grease, oil, and water while still permitting appropriate browning of the foodstuff to be cooked. While aluminum foil containers are generally strong and tear-resistant, such containers typically cannot be used as a cooking container in microwave ovens, but are good cooking instruments when used in conventional ovens, barbeques and convection ovens.

What is needed is a single compartment liner for slow cooking units such as a crock pot that is disposable and which does not interfere with the operation of the crock pot as it operates to cook food. Despite the existence of crock pot liners having other structures, a single compartment liner for cookware is needed to provide a clean cooking environment, and which is simple to manufacture, thereby allowing a cook to prepare meals in the cookware without having the mess associated with such cooking. Such a liner requires simplicity for manufacturing high volumes of liners, and preferably should be readily disposable after use.

U.S. Patent Application Publication No. U.S. 2002/0038802 A1 discloses a dual compartment aluminum crock pot liner which is suitable for use for simultaneously preparing two or more distinct food items in a crock pot. While the multi-compartment crock pot liner has the advantage of cooking multiple food items at the same time, it also has the disadvantage of simultaneously mixing the flavors of the multiple food items because the steam generated from each food being cooked will be circulated within the crock pot interior chamber, thereby intermixing the steam with the various foods being cooked.

U.S. Pat. No. 6,457,601 B1 discloses a liner suitable for use with a Dutch oven. A Dutch oven is a heavy, cast iron cooking apparatus which is subject to harsh cooking environments. Such cast iron cooking instruments are placed directly in contact with a heat source (such as a fire or charcoal briquettes) and are known to provide unequal or uneven heat conduction when cooking, thereby leading to inconsistent cooking results. As such, the disclosed liner will be likewise subject to inconsistent heat conduction and burning of food.

U.S. Pat. No. 6,313,446 B1 discloses a cooker system having a liner for crock pots. The liner is disclosed as having a ribbed exterior wall with a question-mark shaped rim designed to hook on to the cooking system rim disclosed therein to provide a seal between the liner and the cooking system lid. This disclosure has the significant disadvantage of sealing the foodstuff being cooked within the liner thereby preventing steam from escaping from the cooking unit and thereby resulting in the cooking system likely exploding due to a build-up of steam pressure within the liner cooking compartment.

SUMMARY OF THE INVENTION

The present invention is a liner for use with crock pots having a single interior cooking chamber and uniform heating characteristics or like cooking devices. The cookware typically has a base with an inner chamber, the inner chamber designed to receive and transmit heat energy to foodstuff through, for example, a ceramic wall. The walls of the cookware inner chamber may be designed in a number of configurations, such as cylindrical, oval or round. The present liner is formed of an energy conductive material, has an exterior surface and an interior surface and is formed to be insertable into, and removable from, the cookware's inner chamber walls so that the liner's exterior surface substantially registers with and adjacent to the cookware's inner chamber walls while allowing steam to escape the crock pot.

The present invention is a liner for single-chamber crock pots, the liner being preferably formed of a formable heat conducting material which provides good heat conduction, good food browning and is essentially impervious to grease, oil or water penetration. In one embodiment, the present liner is formed of aluminum foil, which is biodegradable and recyclable, thereby allowing ease of use when cooking and ease of cleaning when finished. In another embodiment of the present invention, the liner can be coated with an appropriate non-stick coating (such as, for example, Teflon) to assist in the liner's ability to create a non-stick food surface for cooking.

The present invention is inexpensive, durable while cooking and provides good heat transfer efficiency from the crock pot to the foodstuff being cooked, while at the same time eliminating the need for cleaning the crock pot interior chamber. The present invention also provides an inexpensive solution to the problems associated with foodstuff sticking to cookware surfaces.

BRIEF DESCRIPTION OF THE DRAWINGS

Additional aspects of the present invention will become evident upon reviewing the non-limiting embodiments described in the specification and the claims taken in conjunction with the accompanying figures.

DETAILED DESCRIPTION OF EXEMPLARY EMBODIMENTS

Systems and methods in accordance with various aspects of the present invention provide a novel single compartment liner for use in a slow cooking unit such as a crock pot.

Figure 1A:
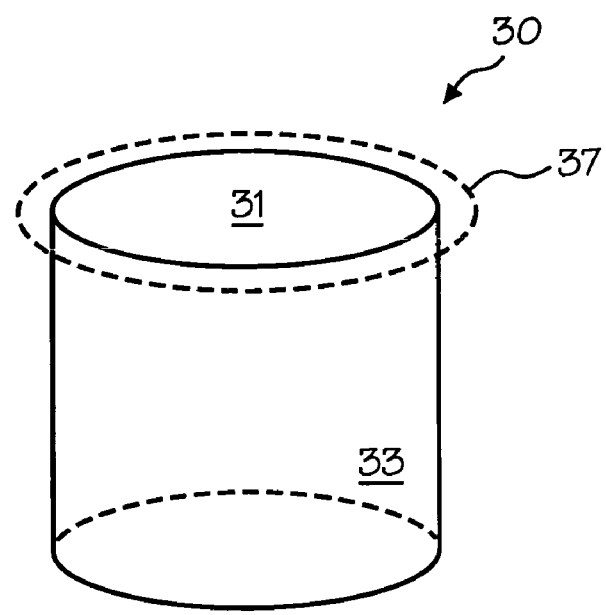
FIG. 1a is a side perspective view of an exemplary embodiment of the present invention.

As seen in FIG. 1a, the present invention is a cooking liner 30 for use in a slow cook device such as a crock pot or like cookware. The liner 30 preferably has a single cooking chamber within an interior wall and a bottom surface 31, the liner 31 comprising a conductive unitary main body portion integrally formed with an optional flange 37, the main body portion of the liner 30 shaped to substantially register with the crock pot's interior wall surfaces.

Figure 1B:
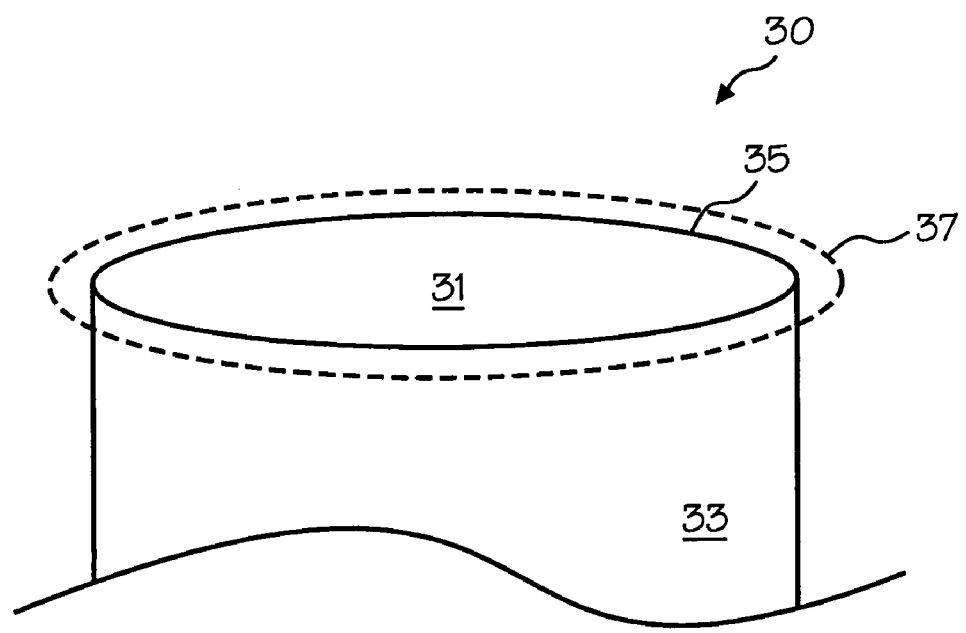
FIG. 1b is a detailed side perspective view of the top portion of an exemplary embodiment of the present invention, illustrating the optional liner lip.
Figure 2:
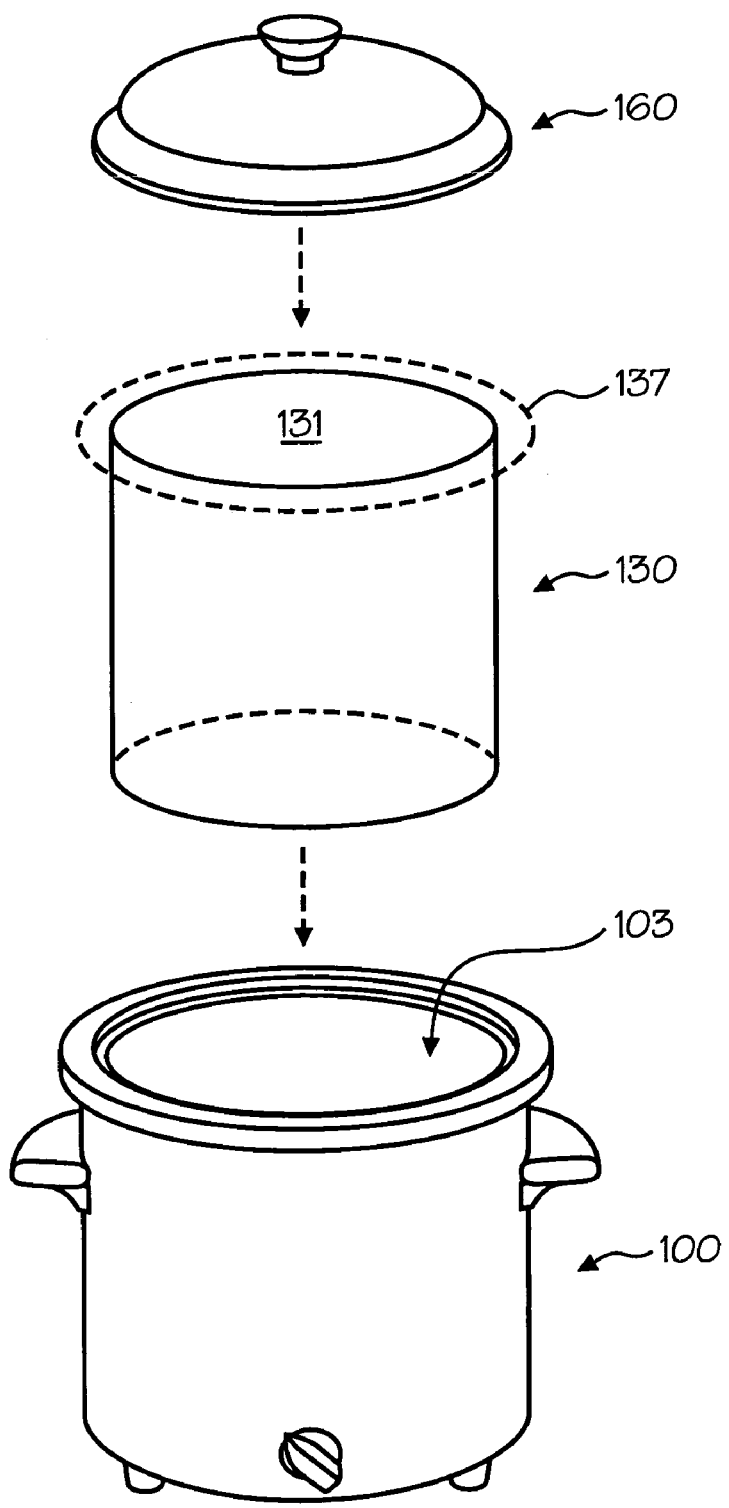
FIG. 2 illustrates an exemplary exploded view of the present invention when used in an circular-shaped crock pot.

As illustrated in FIGS. 1a–2, the present invention liner 30 is formed by conventional forming methods to have a depth of substantially the same or slightly less than the interior depth of the crock pot's 100 single interior chamber 103, and to have a substantially flat or curved bottom surface that merges smoothly with the all surfaces of the crock pot interior wall 103 so that the overall liner 30 structure registers substantially with the interior chamber of the crock pot. The liner's side walls 31 is preferably formed to lie in a plane substantially coincident with the plane of the interior inner crock-pot walls 101 so that the liner 30 conforms substantially to the configuration of the interior cooking surface of the crock pot 100.

In one embodiment as seen in FIG. 1b, the liner top rim 35 may be formed with a flange 37 or may be capable of receiving an optional flange 37 which is adapted to allow steam to escape from the cooking unit, thereby allowing the unit to operate as intended. In one configuration, the flange 37 may contain a plurality of ribs such as those found on a traditional pie plate. In another configuration, flange 37 may be simply formed into a roll. The flange 37 or like apparatus is adapted to sit upon the upper portion of the crock pot and to assist the chef to easily insert the liner into, and remove the liner from, the crock pot interior chamber. Similar to the overall design of the liner, the liner rim 35 will also lie in plane substantially symmetrical to the rim of the crock pot, but having a thickness that cooperates with and does not interfere with the operation of the crock pot lid. As those of skill in the art will now appreciate, the flange 37 may be formed with at least one gap or hole to assist in the release of steam from the cooking unit.

FIG. 2 illustrates an exemplary exploded view of the present invention when used in an circular-shaped crock pot 100. Prior to cooking, liner 130 is placed within the inter single cooking chamber of crock pot 100 so that it registers with interior walls 101. Foodstuff can then be placed inside the interior chamber 131 of liner 130, and cooking commenced when lid 160 is then placed upon the crock pot 100. Optional flange 137 may be formed on liner 130.

Figure 3:
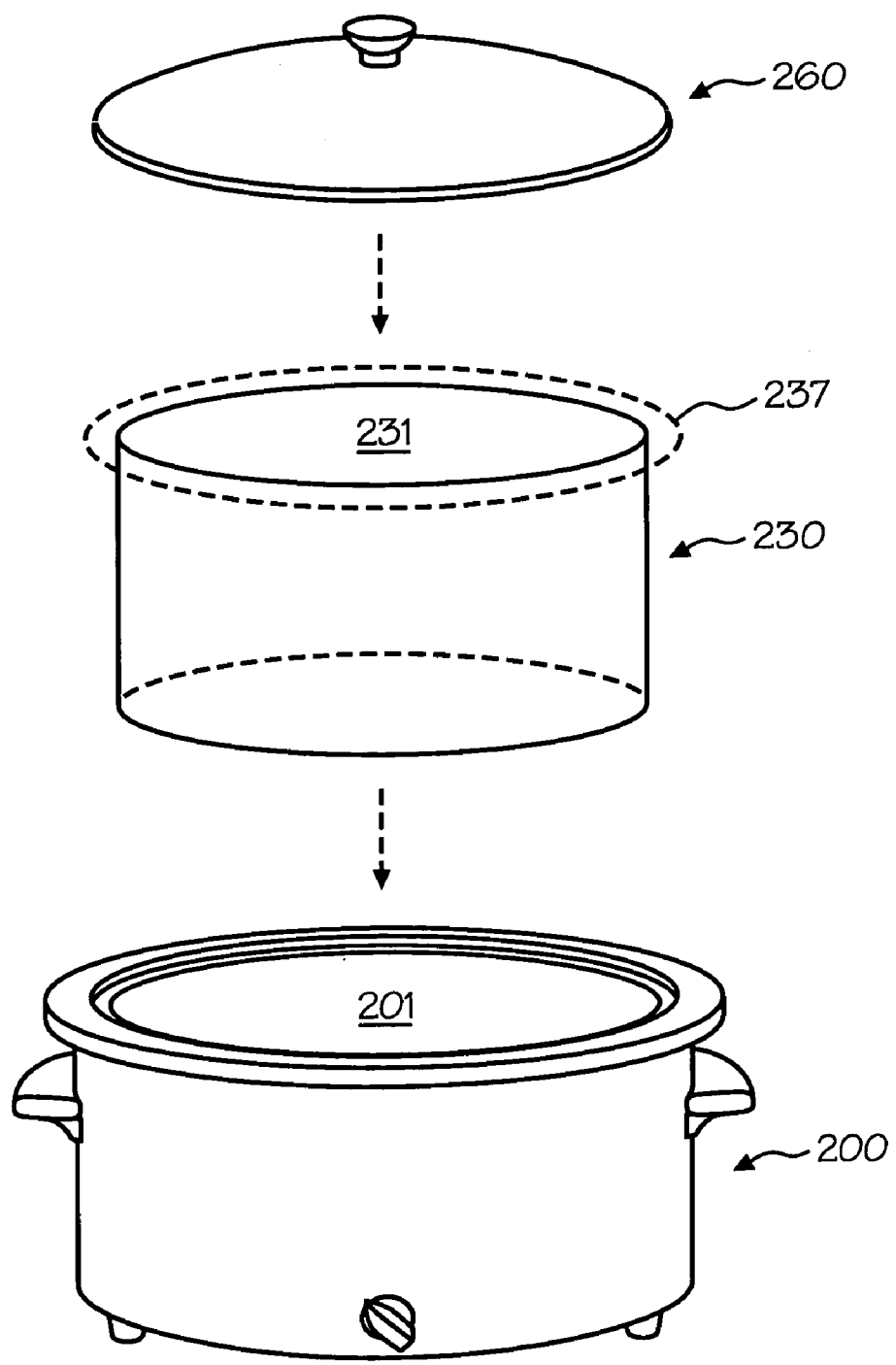
FIG. 3 illustrates an exemplary exploded view of the present invention when used in an oval-shaped crock pot.

Likewise, FIG. 3 illustrates an exemplary exploded view of the present invention when used in an oval-shaped crock pot 200. Prior to cooking, liner 230 is placed within the inter single cooking chamber of crock pot 200 so that it registers with interior walls 201. Foodstuff can then be placed inside the interior chamber 231 of liner 230, and cooking commenced when lid 260 is then placed upon the crock pot 200. Again, optional flange 237 may be formed on liner 230.

While not illustrated, those of skill in the art will come to realize that the present liner invention can also incorporate at least one predefined message which is imprinted thereon for marketing purposes.

A significant advantage of the present invention is the ability to substantially eliminate the cleaning associated with crock pot use. During conventional crock pot usage, food is slow cooked over time without much attention given to the crock pot by the chef, thereby resulting in foodstuff sticking to the interior chamber walls of the crock pot. With the present invention, after the food is cooked, the chef can easily discard the liner. There is no need to clean the liner, as a new liner can be utilized the next time the crock pot is used. The present invention preferably is formed from a tear-resistant material which substantially eliminates tears, spills and leaks from occurring.

Embodiments of the present invention can be formed into stackable trays or containers or like shaped articles for use in single container crock pots. The present invention is preferably formed of material which is resistant to oil, water moisture, grease and foodstuff, yet, allow sufficient conduction of energy (such as, for example, heat energy) to be transferred through its structure walls. In another embodiment, the present invention will be designed to allow multiple uses, if necessary.

The present invention has the advantage that it is easily disposable, easily recyclable and biodegradable. Moreover, due to the tensile strength characteristics of metal foil (such as aluminum, tin, titanium, bronze, brass, copper or any combination thereof), the present invention can readily be shaped to form a food container which registers with the variety of different shaped single-compartment crock pots available on the market today.

Other variations and modifications of the present invention will be apparent to those of ordinary skill in the art, and it is the intent of the appended claims that such variations and modifications be covered. The particular values and configurations discussed above can be varied, are cited to illustrate representative embodiments of the present invention and are not intended to limit the scope of the invention.

What is claimed is:

1. A liner for crock pots having an interior cooking chamber with an inner chamber defined by at least one ceramic wall surface with an upper perimeter lip, the liner comprising an energy conductive material having an exterior surface and an interior surface, the liner being formed to be insertable into, and removable from, the crock pot's inner chamber so that the liner's exterior surface substantially registers with and is adjacent to the cookware's inner chamber while not interfering with the operation of the crock pot, the liner further having a top rim and an integrally formed flange coupled to the top rim and with at least one gap, the at least one gap adapted to allow steam to escape from the crock pot when in operation and not adapted to form fit the upper perimeter lip.

2. The liner of claim 1, the liner's top rim formed to lie in a plane substantially symmetrical to a top rim of the crock pot, the liner top rim having a thickness which cooperates with and prevents interference with the operation of the crock pot.

3. The liner of claim 1, the conductive liner being formed from aluminum foil.

4. A liner for slow cooking cookware having an interior cooking chamber with at least one wall surface with an upper perimeter lip, the liner comprising an energy conductive unitary main body having an interior surface and an exterior surface a top rim and an integrally formed flange with at least one gap, the liner being formed so that the liner's exterior surface substantially registers with and is adjacent to the cookware's interior chamber walls, the conductive sheet formed to prevent interfering with the operation of the cookware as the cookware operates, the gap adapted to allow steam to escape from the interior surface when the slow cookware is in operation and not adapted to form fit the upper perimeter lip.

5. The liner of claim 4, the liner having a depth of substantially the same or approximately less than an interior depth of the slow cooking cookware's interior cooking chamber.

6. The liner of claim 4, the liner having a substantially flat or slightly curved bottom surface which substantially registers with a bottom surface of the slow cooking cookware's interior cooking chamber.

7. The liner of claim 4, the liner further having at least one side wall defining the main body, the side wall formed to lie in a plane substantially coincident of the slow cookware's interior cooking chamber.

8. The liner of claim 5, the liner's top rim formed to lie in a plane substantially symmetrical to a top rim of the slow cookware, the top rim having a thickness which cooperates with and prevents interference with the operation of the slow cookware.

9. The liner of claim 5, the flange being formed into a plurality of ribs.

10. The liner of claim 5, the flange being formed into a roll.

11. The liner of claim 4, the conductive liner being formed from aluminum foil.

12. The liner of claim 4, the conductive liner being formed from at least one of aluminum foil, copper foil, bronze foil, tin foil, titanium foil and brass foil.

13. The liner of claim 4, at least some portions of the conductive sheet imprinted with a predefined message.

14. The liner of claim 4, the slow cooking cookware being an oval-shaped crock pot, the liner being adapted for placement within the oval-shaped crock pot so that its exterior walls register with the interior chamber of the crock pot.

15. The liner of claim 4, the slow cooking cookware being an circular-shaped crock pot, the liner being adapted for placement within the circular-shaped crock pot so that its exterior walls register with the interior chamber of the crock pot.

16. A crock pot liner, the liner comprising an energy conductive material having an exterior surface and an interior surface, the liner being formed to be insertable into, and removable from, an inner cooking chamber of the crock pot so that the liner's exterior surface substantially registers with and is adjacent to the crock pot's inner cooking chamber while not interfering with the operation of the crock pot, the liner having a depth of substantially the same or approximately less than an interior depth of the crock pot's interior cooking chamber, and further having a substantially flat or slightly curved bottom surface which substantially registers with a bottom surface of the crock pot's interior cooking chamber, the liner further comprising an integrally formed, rollable top rim adapted to sit upon an upper perimeter lip of the crock pot, allow steam to escape from the interior surface when the crock pot is in operation.

17. A crock pot liner, the liner comprising an unitary exterior surface and an interior surface formed of an energy conductive material, the liner being insertable into, and removable from, an inner cooking chamber of the crock pot so that the liner's exterior surface substantially registers with and is adjacent to an interior surface of the crock pot, the liner further comprising a rollable top rim, the liner interior surface further adapted to sit upon an upper perimeter lip of the crock pot receive and retain foodstuff.

18. The liner of claim 17, the top rim being adapted to allow steam to escape from the crock pot when in operation.

19. The liner of claim 17, the liner further comprising a substantially flat or slightly curved bottom surface which substantially registers with a bottom surface of the slow cooking cookware's interior cooking chamber.

20. The liner of claim 18, the liner further having an interior surface depth of substantially the same or approximately less than an interior depth of the slow cooking cookware's interior cooking chamber.

21. A liner for a slow cook device having an interior cooking chamber with an inner chamber defined by at least one wall surface with an upper perimeter lip, the liner comprising a non-aluminum thermally conductive unitary body having an exterior surface and an interior surface, the interior surface defining a single cooking compartment adapted to receive foodstuff, the liner being insertable into, and removable from, the slow cook device's inner chamber so that the liner's exterior surface is adjacent to the device's inner chamber, the liner further having a top rim and an integrally formed flange with at least one gap adapted to sit upon an upper portion of the device to allow steam to escape from the device when in operation and not adapted to form fit the upper perimeter lip.

22. The liner of claim 21, the liner's top portion having a thickness which cooperates with and prevents interference with the operation of the crock pot.

23. The liner of claim 21, the liner having an interior surface coated with a non-stick material.

24. The liner of claim 21 the liner having a bottom surface which substantially registers with, and is coincident to, a bottom surface of the slow cooking cookware's interior cooking chamber.

25. The liner of claim 21, the liner's top portion being rollable.

26. A disposable slow cook unit liner, the slow cook unit having an interior cooking chamber with an inner chamber defined by at least one continuous wall surface with an upper perimeter lip, the liner comprising a non-aluminum body having an exterior surface and an interior surface, the interior surface defining a single cooking compartment, the liner being insertable into, and removable from, the slow cook device's inner chamber so that the liner's exterior surface substantially registers with and is adjacent to the unit's interior cooking chamber, the liner further having a top rim and an integrally formed flange with at least one gap adapted to sit upon an upper perimeter lip of the device and to allow steam to escape from the device when in operation and not adapted to form fit the upper perimether lip device when in operation.

27. The liner of claim 26, the liner's top portion having a thickness which cooperates with and prevents interference with the operation of the crock pot.

28. The liner of claim 26, the liner having a depth of substantially the same or approximately less than an interior depth of the slow cooking cookware's interior cooking chamber.

29. The liner of claim 26, the liner having a bottom surface which substantially registers with, and is coincident to, a bottom surface of the slow cooking cookware's interior cooking chamber.

30. The liner of claim 26, the liner's top portion being rollable.

31. The liner of claim 26, the liner's interior surface being coated with a non-stick material.

* * * * *

UNITED STATES PATENT AND TRADEMARK OFFICE
CERTIFICATE OF CORRECTION

| | | |
|---|---|---|
| PATENT NO. | : 7,112,764 C1 | Page 1 of 1 |
| APPLICATION NO. | : 90/009359 | |
| DATED | : December 15, 2009 | |
| INVENTOR(S) | : Kristy Kailynn Garcia | |

It is certified that error appears in the above-identified patent and that said Letters Patent is hereby corrected as shown below:

In Claim 1, Col. 1, line 33, the words "the line" is replaced with the words "the liner";

In Claim 33, Col. 4, line 4, the word "fromed" is replaced with the word "formed"; and In Claim 37, Col. 4, line 23, the words "energy coductive body" is replaced with the words "energy conductive body".

Signed and Sealed this
Fourteenth Day of February, 2012

David J. Kappos
*Director of the United States Patent and Trademark Office*

(12) EX PARTE REEXAMINATION CERTIFICATE (7247th)
United States Patent
Garcia

(10) Number: US 7,112,764 C1
(45) Certificate Issued: Dec. 15, 2009

(54) DISPOSABLE LINER FOR COOKWARE

(75) Inventor: Kristy Kailynn Garcia, Albuquerque, NM (US)

(73) Assignee: KKG LLC, Albuquerque, NM (US)

Reexamination Request:
No. 90/009,359, Dec. 6, 2008

Reexamination Certificate for:
Patent No.: 7,112,764
Issued: Sep. 26, 2006
Appl. No.: 10/619,314
Filed: Jul. 14, 2003

Related U.S. Application Data

(60) Provisional application No. 60/450,495, filed on Feb. 27, 2003.

(51) Int. Cl.
*F27D 11/00* (2006.01)
*A47J 36/16* (2006.01)

(52) U.S. Cl. .................. 219/429; 219/432; 220/573.4; 220/573.5

(58) Field of Classification Search .............. 220/495.04
See application file for complete search history.

(56) References Cited

U.S. PATENT DOCUMENTS

| | | |
|---|---|---|
| 3,587,447 A | 6/1971 | Larkin |
| 3,677,438 A | 7/1972 | Esposito |
| 3,724,711 A | 4/1973 | George et al. |
| 3,779,231 A | 12/1973 | Anderson |
| 3,799,048 A | 3/1974 | Finley |
| 3,828,966 A | 8/1974 | Martin |
| 3,867,249 A | 2/1975 | Vitale et al. |
| 4,005,645 A | 2/1977 | Janssen |
| 4,164,174 A | 8/1979 | Wallsten |
| 4,215,629 A | 8/1980 | Janssen |
| 4,320,699 A | 3/1982 | Binks |
| 4,499,817 A | 2/1985 | Janssen |
| 4,855,183 A | 8/1989 | Oberle |
| 5,044,265 A | 9/1991 | Janssen |
| 5,048,688 A | 9/1991 | Hicks, Jr. |
| 5,298,326 A | 3/1994 | Norpoth et al. |
| 5,515,990 A | 5/1996 | Popeil et al. |
| 5,556,925 A | 9/1996 | Kousaka et al. |
| 5,613,427 A | 3/1997 | Wiley |
| 6,193,831 B1 | 2/2001 | Overcash et al. |
| 6,231,953 B1 | 5/2001 | Mossbrook et al. |
| 6,313,446 B1 | 11/2001 | Jones |
| 6,398,060 B1 | 6/2002 | Apostolides |
| 6,457,601 B1 | 10/2002 | Chappell |

(Continued)

FOREIGN PATENT DOCUMENTS

| | | |
|---|---|---|
| EP | 1576915 A1 | 9/2005 |
| FR | 2210370 A | 8/1974 |
| FR | 2795613 A1 | 1/2001 |
| GB | 2143424 A | 2/1985 |
| GB | 2221143 A | 1/1990 |

OTHER PUBLICATIONS

Product packaging and inner sealed bagt for a product titled "Crock–Pot–Liners by Cook–in–a–Crock" Date of publication: Not identified on product packaging Author: "Cook–in–a–Crock, PO Box 302, Pomona, NY 10970".

*Primary Examiner*—Aaron J. Lewis

(57) ABSTRACT

A disposable insert or liner conformable to a slow cook cookware (such as, for example, a conventional crock pot or like slow cooking device) having a single interior cooking chamber. The liner is adapted to fit within the interior chamber of a crockpot so as to substantially be in adjacent contact with the crock pot interior chamber walls without interfering with the operation of the cooking device. The liner provides a single compartment which may be made of any material allowing heat conduction between the cookware and the liner. A suitable material may be a tear resistant aluminum foil to withstand typical food preparation in a crock pot. In one embodiment, the present invention includes a flange, notches, indentations or other formations which assist in the insertion and removal of the present invention in the cookware. The present invention advantageously provides for a desirable cooking environment, allows easy removal of food from the crock pot and provides simplified cleaning of the crock pot.

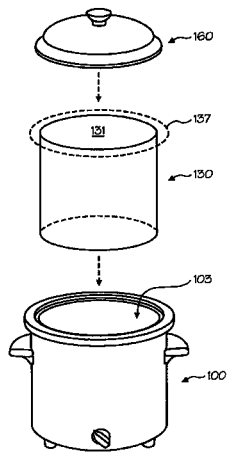

U.S. PATENT DOCUMENTS

| | | |
|---|---|---|
| 6,684,760 B1 | 2/2004 | Rajusth |
| 6,892,896 B2 | 5/2005 | Barniak, Jr. |
| 7,163,120 B1 | 1/2007 | Blucher |
| 2002/0038802 A1 | 4/2002 | Von Tersch |
| 2002/0079316 A1 | 6/2002 | Greenfield |
| 2005/0076793 A1 | 4/2005 | Sizer |

US 7,112,764 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 4, 13, 16–22, 24 and 26–29 are determined to be patentable as amended.

Claims 2, 3, 5–12, 14, 15, 23, 25, 30 and 31, dependent on an amended claim, are determined to be patentable.

New claims 32–39 are added and determined to be patentable.

1. A liner for crock pots having an interior cooking chamber with an inner chamber defined by at least one ceramic wall surface with an upper perimeter lip, the liner comprising an energy conductive material having an exterior surface and an interior surface, the liner being formed to be insertable into, and removable from, the crock pot's inner chamber so that the liner's exterior surface substantially registers with and is adjacent to the cookware's inner chamber while not interfering with the operation of the crock pot, the line further having a top rim and an integrally formed flange coupled to the top rim and with at least one gap, the at least one gap adapted to allow steam to escape from [the crock pot] *foodstuff within the liner's interior surface* when *the crock pot is* in operation *and the at least one gap not adapted to form fit the upper perimeter lip*.

4. A liner for slow cooking cookware having an interior cooking chamber with at least one wall surface with an upper perimeter lip, the liner comprising an energy conductive unitary main body having an interior surface and an exterior surface a top rim and an integrally formed flange with at least one gap, the liner being formed so that the liner's exterior surface substantially registers with and is adjacent to the cookware's interior chamber walls, the conductive [sheet] *body* formed to prevent interfering with the operation of the cookware as the cookware operates, the gap adapted to allow steam to escape from the interior surface when the slow cookware is in operation *and not adapted to form fit the upper perimeter lip*.

13. The liner of claim 4, at least some portions of the conductive [sheet] *body* imprinted with a predefined message.

16. A crock pot liner, the liner comprising an energy conductive material having an exterior surface and an interior surface, the liner being formed to be insertable into, and removable from, an inner cooking chamber of the crock pot so that the liner's exterior surface substantially registers with and is adjacent to the crock pot's inner cooking chamber while not interfering with the operation of the crock pot, the liner having a depth of substantially the same or approximately less than an interior depth of the crock pot's interior cooking chamber, and further having a substantially flat or slightly curved bottom surface which substantially registers with a bottom surface of the crock pot's interior cooking chamber, the liner further comprising an integrally formed, rollable top rim adapted to sit upon an upper perimeter lip of the crock pot, *to* allow steam to escape from the interior surface when the crock pot is in operation.

17. A crock pot liner, the liner comprising an unitary exterior surface and an interior surface formed of [an] *a durable* energy conductive material, *the liner having an interior chamber defined by the liner's interior surface* the liner being insertable into, and removable from, an inner cooking chamber of the crock pot so that the liner's exterior surface substantially registers with and is adjacent to an interior surface of the crock pot, the liner further comprising a rollable top rim *having an integrally formed flange with at least one gap, the gap adapted to allow steam to escape from the liner's interior chamber when the crock pot is in operation and not adapted to form fit an upper perimeter lip of the crock pot*, the liner interior surface further adapted to sit upon [an] *the* upper perimeter lip of the crock pot [received and retain foodstuff].

18. The liner of claim 17, [the top rim being adapted to allow steam to escape from the crock pot when in operation] *the liner's interior surface adapted to receive and retain foodstuff within the interior chamber without tearing and without foodstuff spillage into the interior surface of the crock pot while the crock pot is in operation*.

19. The liner of claim 17, the liner further comprising a substantially flat or slightly curved bottom surface which substantially registers with a bottom surface of the [slow cooking cookware's] *crock pot's* interior cooking chamber.

20. The liner of claim 18, the liner further having an interior surface depth of substantially the same or approximately less than an interior depth of the [slow cooking cookware's] *crock pot's* interior cooking chamber.

21. A liner for a slow cook device having an interior cooking chamber with an inner chamber defined by at least one wall surface with an upper perimeter lip, the liner comprising a *durable,* non-aluminum thermally conductive unitary body having an exterior surface and an interior surface, the interior surface defining surface defining a single cooking compartment adapted to receive *and retain* foodstuff *without spillage while the slow cook device operates*, the liner being insertable into, and removable from, the slow cook device's inner chamber so that the liner's exterior surface is adjacent to the device's inner chamber, the liner further having a top rim and an integrally formed flange with at least one gap adapted to sit upon an upper portion of the device to allow steam to escape from [the device] *foodstuff within the liner* when *the slow cook device is* in operation [and] *, the at least one gap not being* adapted to form fit the upper perimeter lip.

22. The liner of claim 21, the liner's top portion having a thickness which cooperates with and prevents interference with the operation of the [crock pot] *slow cook device*.

24. The liner of claim 21 the liner having a bottom surface which substantially registers with, and is coincident to, a bottom surface of the slow [cooking cookware's] *cook device's* interior cooking chamber.

26. A disposable slow cook unit liner, the slow cook unit having an interior cooking chamber with an inner chamber defined by at least one continuous wall surface with an upper perimeter lip, the liner comprising a non-aluminum body having an exterior surface and an interior surface, the interior surface defining a single cooking compartment, the liner being insertable into, and removable from, the slow cook [device's] *unit's* inner chamber so that the liner's exterior surface substantially registers with and is adjacent to the unit's interior cooking chamber, the liner further having a top rim and an integrally formed flange with at least on gap adapted to sit upon an upper perimeter lip of the [device] *unit* and to allow steam to escape from the [device] *liner* when *the unit is* in operation and *the at least one gap is* not adapted to form fit the upper perimeter lip device when *the unit is* in operation.

27. The liner of claim 26, the liner's top portion having a thickness which cooperates with and prevents interference with the operation of the *unit* [crock pot].

28. The liner of claim 26, the liner having a depth of substantially the same or approximately less than an interior depth of the [slow cooking cookware's] *unit's* interior cooking chamber.

29. The liner of claim 26, the liner having a bottom surface which substantially registers with, and is coincident to, a bottom surface of the [slow cooking cookware's] *unit's* interior cooking chamber.

*32. A crock pot liner, the liner comprising a durable energy conductive material having an exterior surface and an interior surface, the liner being unitarily formable for insertion into and completely removable from an inner single cooking chamber of the crock pot so that the liner's exterior surface substantially registers with and its adjacent to the crock pot's single inner cooking chamber while cooperating with and not interfering with the operation of the crock pot, the liner having a depth of substantially the same or approximately less than an interior depth of the crock pot's single interior cooking chamber, and further having a bottom surface which substantially registers with or is adjacent to a bottom surface of the crock pot's interior cooking chamber, the liner further comprising an integrally formed top rim adapted to sit upon an upper perimeter lip of the crock pot, the top rim further including at least one gap adapted to allow steam to escape from foodstuff within the liner's interior surface when the crock pot is in operation.*

*33. The liner of claim 32, the liner's top rim fromed to lie in a plane substantially symmetrical to and outside of the upper perimeter lip of the crock pot, the top rim having a thickness which prevents interference with the operation of the crock pot.*

*34. The liner of claim 33, wherein each gap is not adapted to form fit the crock pot's upper perimeter lip.*

*35. The liner of claim 34, the liner's interior surface adapted to receive and retain foodstuff without tearing while the crock pot is in operation.*

*36. The liner of claim 35, at least some portion of the liner being imprinted with a predefined message.*

*37. A liner of a slow cooker having a single interior cooking chamber defined by at least one ceramic wall surface with an upper perimeter lip, the liner comprising a tear-resistant, durable energy coductive body having an exterior surface and an interior surface, the liner's interior surface adapted to receive and retain foodstuff without tearing while the slow cooker is in operation, the liner being unitarily insertable into and unitarily removable from the slow cooker's inner chamber, the liner further comprising an integrally formed top rim adapted to sit upon the slow cooker's upper perimeter lip, the top rim further having at least one gap adapted to allow steam to escape from the foodstuff when the slow cooker is in operation.*

*38. The liner of claim 37, the liner's top rim formed to lie in a plane substantially symmetrical to and outside of the upper perimeter lip of the slow cooker.*

*39. The liner of claim 38, the top rim further comprising an integrally formed flange with at least one gap, the gap being not adapted to form fit the slow cooker's upper perimeter lip.*

\* \* \* \* \*